United States Patent

Moynihan

[11] Patent Number: 5,954,372
[45] Date of Patent: Sep. 21, 1999

[54] APPARATUS FOR SPLICING DRIP TAPE

[75] Inventor: Mark Moynihan, Alta Loma, Calif.

[73] Assignee: Agricultural Products, Inc., Ontario, Calif.

[21] Appl. No.: 08/854,909

[22] Filed: May 13, 1997

[51] Int. Cl.[6] .................................................. F16L 55/00
[52] U.S. Cl. ........................................ 285/148.27; 285/242
[58] Field of Search .................................... 285/242, 260, 285/252, 253, 13, 14, 239, 254, 148.27, FOR 160, 243, 244, 259

[56] References Cited

U.S. PATENT DOCUMENTS

| | | | |
|---|---|---|---|
| 382,468 | 5/1888 | Haley | 285/243 |
| 431,167 | 7/1890 | Jones | 285/252 X |
| 1,778,244 | 10/1930 | Cadden | 285/259 X |
| 1,897,319 | 2/1933 | McKee | 285/254 |
| 1,994,784 | 3/1935 | Porzel | 285/239 |
| 3,442,538 | 5/1969 | Glasscock et al. | 285/148.27 |
| 4,597,594 | 7/1986 | Kacalieff | 285/259 X |
| 4,603,890 | 8/1986 | Huppee | 285/242 X |
| 4,626,005 | 12/1986 | Stifter | 285/239 X |

FOREIGN PATENT DOCUMENTS

| | | | |
|---|---|---|---|
| 1359919 | 3/1964 | France | 285/260 |
| 2652872 | 4/1991 | France | 285/239 |
| 2624241 | 12/1977 | Germany | 285/239 |
| 884698 | 12/1961 | United Kingdom | 285/260 |

*Primary Examiner*—Dave W. Arola
*Attorney, Agent, or Firm*—Daniel L. Dawes

[57] ABSTRACT

A fluid drip tape splicing coupling is provided with two sequential sections, the first of which possesses a plurality of circumferential frustoconical barbs of essentially equal diameter. In the second section, which likewise contains a plurality of frustoconical barbs, at least one of the frustoconical barbs, a step barb, possesses a dimension, transverse to the axis of the coupling, which is greater than the diameter of the frustoconical barbs in the first section of the coupling. The step barb may be circular or elliptic in cross section. The fluid drip tape may be joined over this coupling by sliding and stretching a first piece of drip tape over the first section, which has been azimuthally aligned to line up the seam of the drip tape with the radial high point of step barb, until the tape abuts the step barb. A second piece of tape is slid over the coupling from the opposite direction over the second section and over the step barb until it overlaps the first drip tape. A single wire tie or tightening sleeve may then by constricted around the region of overlap at a point between successive frustoconical barbs in the first section for a fluid-tight fit.

16 Claims, 3 Drawing Sheets

APPARATUS FOR SPLICING DRIP TAPE

BACKGROUND OF THE INVENTION

1. Field of the Invention

This invention relates to the field of fluid transport, and more particularly to methods and apparatus for joining two pieces of fluid drip tape.

2. Description of Prior Art

It is often necessary to join two pieces of drip tape. For example, it may be desired to repair a tape which has begun to leak or more simply just to extend a line of tape. This operation is typically accomplished by cutting the tape into two sections and then cutting away a small length of the tape section containing the leak. Then the two sound sections of tape are spliced together to create a final, leak-tight longer section. The splice is often accomplished by inserting, within one section of the tape, a barbed coupling consisting of an essentially cylindrical structure having several circumferential ridges—i.e., frustoconical barbs—along its length. The frustoconical barb diameter is normally slightly larger than the inner diameter of the tape, to insure a close fit. A wire tie or tightening sleeve (such as a conventional screw-driven hose clamp, as used to connect a radiator hose to a radiator) is then slid over that section of tape, so that it surrounds a portion of the coupling within the tape. Another wire tie or tightening sleeve is slid over the opposing section of tape. Then that opposing section of tape is slid over the other end of the barbed coupling. Finally, both wire ties are tightly twisted, or the tightening sleeves are screw-tightened, so that the two tape sections are respectively sealed against the coupling within them. The result is a leak-tight tape.

In an exactly similar manner, two tapes may be joined by insertion of such a coupling. When each section is sealed to the coupling, by means of a wire tie or tightening sleeve, a longer tape is created with a fluid-tight junction. Similarly, this could be done to produce longer sections of plastic tape for irrigation use.

Such splicing of fluid drip tape sections has particular application in the field of crop irrigation. The days of unlimited water for irrigation are long since past. Today, it is necessary to conserve irrigation water, and this is commonly accomplished by use of drip tapes. A drip tape is essentially a thin walled, flexible water drip tape. It is normally flat in cross-section until water is driven through it, whereupon it swells to an essentially elliptic or even circular cross-section. Along the length of a drip tape are a succession of drip holes, through which a reasonably determinable flow of water is allowed to pass when the drip tape is in use. When the drip tape is installed, these holes are placed at those locations where it is desired to deliver water, for example at planted seeds or the roots of plants. The entire tape, or portions of it, may be buried beneath the surface, so as to reduce loss by evaporation and to insure delivery of water near the exact location desired, without wastage by moistening unproductive soil.

In actual use, these drip tapes are joined in a complex network of channels, fed by a single inlet source of water. Thus, merely by opening a valve at the inlet, water may be supplied, drip by drip, to those particular locations—perhaps many thousands in number—where pinpoint irrigation is desired. Of course, in order to create such a network, a large number of drip tapes must be joined.

Typically, these splices have been accomplished in a manner closely analogous to the tape splicing method discussed above. Each piece of drip tape is slipped over an coupling—usually made of plastic—from opposite ends, and each end is water-sealed to the coupling by means of a wire tie. One tie is used for each end of the drip tape.

However, this commonly-employed method is wasteful, largely because application of two wire ties to a single splice requires a considerable amount of time. Because of increasing agricultural labor rates, this expenditure of time can accumulate alarmingly. Also, it is clear that use of two wire ties or tightening sleeves per junction entails purchase of a vast number of such sealing elements. Either or both of these costs—for labor and hardware—can add greatly to the cost of food production, which, particularly from the farmer's point of view, is generally a low-margin business.

What is needed is a method of joining two pieces of thin walled drip tapes, which does not require two separate wire ties or tightening sleeves. Clearly, this can not readily be accomplished simply by inserting the end of one piece of drip tape over one end of the coupling, then sliding the end of the other drip tape over the first to overlap it and finally sealing the junction by applying a single wire tie or tightening sleeve to the overlap portion. While this might theoretically be possible with drip tapes, which are thin and flexible, even here it would be difficult to slide the end of one drip tape over the other sufficiently to create a water-tight seal—at least without the expenditure of at least as much effort as would be required to apply a second wire tie or tightening sleeve.

Thus, what is needed is some type of splicing coupling which is economical to manufacture, whose use is simple and requires only a single wire tie or tightening sleeve per junction.

BRIEF SUMMARY OF THE INVENTION

The invention is a fluid drip tape coupling having two integral portions. The first portion possesses a sequence of outwardly extending frustoconical barbs of essentially equal diameter, much as in the case of the prior art device previously described. However, in the second section, which likewise contains a sequence of outwardly extending frustoconical barbs, at least one of the frustoconical barbs possesses a dimension, transverse to the axis of the coupling, which is greater than the diameter of the frustoconical barbs in the first section of the coupling. This one larger frustoconical barb is called the "step barb". Preferably, each of the frustoconical barbs are circular in cross-section. Normally, the section of the coupling containing the step barb will also contain another frustoconical barb of smaller diameter, which eases installation.

In structure, viewed longitudinally from one end to the other, an opening is followed by a first section having a sequence of outwardly extending frustoconical barbs of equal diameter separated by lengths of exterior surface of the coupling of somewhat smaller diameter, followed by a second section having a sequence of outwardly extending frustoconical barbs oriented in the opposite direction. The first one of these reverse barbs is the step barb and is larger than those in the first sequence previously described and is oriented in the opposite direction. It is then followed by a similarly reversed frustoconical barb of smaller diameter than the step barb, and finally terminating in an opening resembling that at the other end of the coupling. The centers of the frustoconical barbs of the first sequence are offset from the centers of the frustoconical barbs of the second sequence by a predetermined distance in a direction perpendicular to the longitudinal axis of the coupling. In other words, the barbs on one side of the coupler are eccentric relative to the barbs on the other side.

Using this novel coupling, the end of a first piece of flexible and at least partially elastic fluid drip tape, or irrigation tape, is slid over the first section of the coupling, and aligned with it's overlap located at the largest step from the first section of the coupling to the outside diameter of the step barb until it abuts the larger frustoconical barb or step barb. Then the end of a second piece of fluid drip tape is slid over the opposing second section until it extends substantially beyond the step barb, thus overlapping a portion of the first piece of fluid drip tape. A single wire tie or tightening sleeve may then be disposed around the region of overlap at a point between successive frustoconical barbs in the first section for a fluid-tight fit. The two pieces of fluid drip tape will not readily separate, because the tightening has occurred in an intermediate region between two successive frustoconical barbs, each in a different section of the coupling, namely the barbs in the first section and the step barb.

Because the barbs of the first and second sections are offset or eccentric with respect to each other, the diameter over which the second piece of drip tape must be stretched as it is overlapped with the first piece of drip tape is minimized, therefore optimizing ease of installation. Most drip tape is made from sheet which has been wrapped and bonded to form a tube having a longitudinal seam of double thickness. Having a uniform step would require more stretching of the second piece of tape than is necessary because the tape is thickest only at a short section around its circumference. In other words, the first piece of drip tape can be oriented so that the double thick seam coincides with the largest step between the first section of the coupling and the step barb. The second piece of drip tape can more easily be pulled onto the coupling because the diameter of the step barb in the second section can be smaller than that which would be necessary with a concentric step barb.

The invention may now be better visualized in the following drawings where like elements are referenced by like numerals.

Figure 1:
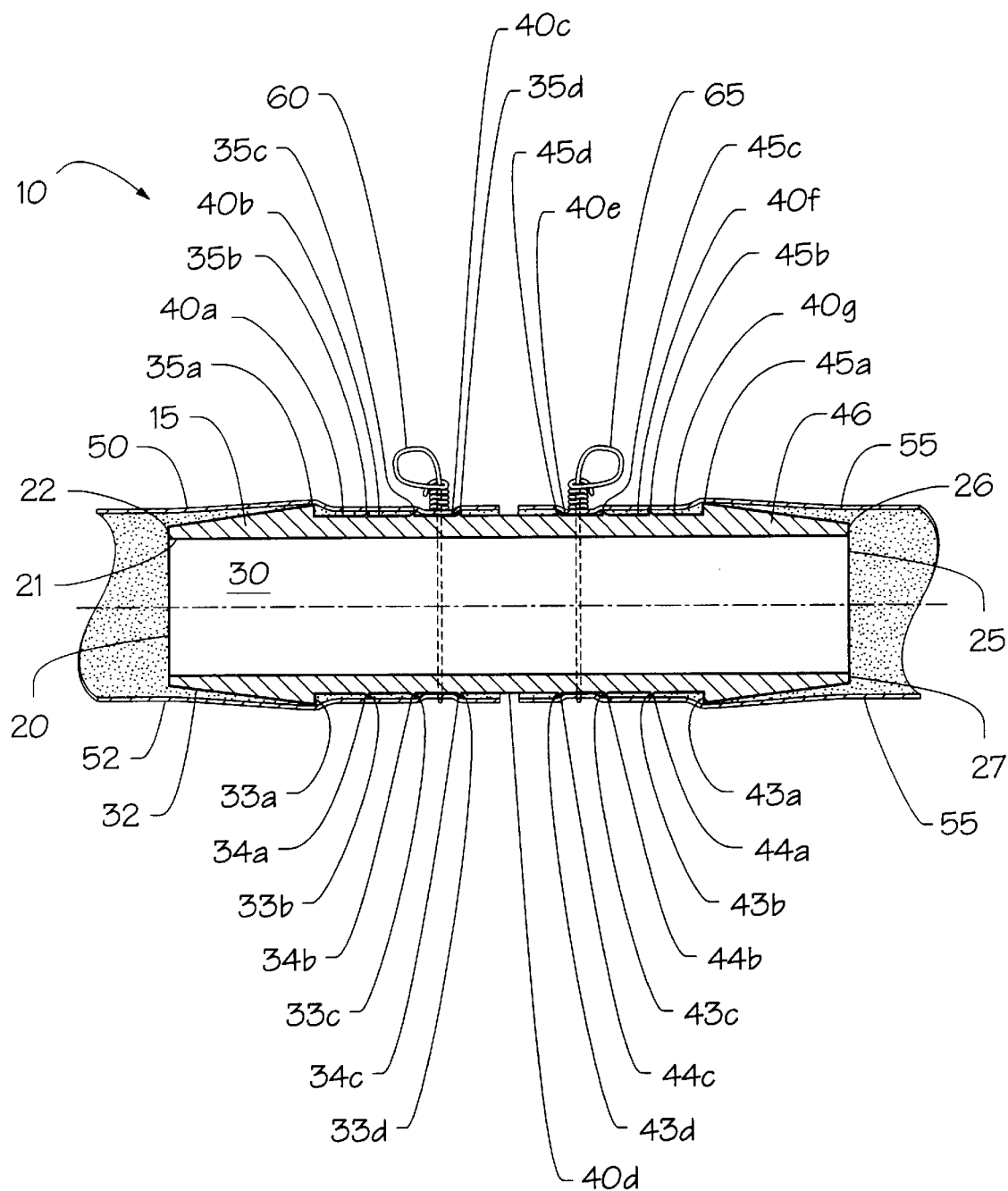
FIG. 1 is a side cross-sectional view of the principal prior art device.

The invention now having been summarized and illustrated, turn to the following detailed description of the illustrated and preferred embodiments.

DETAILED DESCRIPTION OF THE PREFERRED EMBODIMENTS

In order to fully describe the preferred embodiment of the present invention, it may be beneficial to refer, in more detail, to the principal prior art device, briefly described above. It will be noted that throughout the following discussion, referring to all side elevation illustrations in the Drawings, the left end of the device will be referred to as the inlet end, and the right end will be referred to as the outlet end, fluid flow being from left to right. Of course, this choice is merely made for convenience and clarity in description, and it could have been reversed.

Further, for the purposes of clarity of discussion, the prior art device will be referred to as a "two-tie junction coupling", while each preferred embodiment of the present invention will be designated a "one-tie splicing coupling". However, it will be understood that their functions are analogous.

Accordingly, FIG. 1 shows such a prior art fluid drip tape junction coupling 10, comprising an outer structure 15, whose cross-section is essentially a series of circles throughout its entire length, surrounding an essentially cylindrical bore 30. The junction coupling 10 possesses an inlet opening 20, comprising an inner circumference 21 and an outer circumference 22, with outer structure 15 intervening. Likewise, the junction coupling 10 possesses an outlet opening 25, comprising an inner circumference 26 and an outer circumference 27, with outer structure 15 intervening.

The outer surface of the junction coupling 10 progresses from its inlet opening 20, through its straight inlet taper 32 to the first frustoconical barb 35a. The downstream slope 33a of that first frustoconical barb 35a is perpendicular to the axis 6 of the junction coupling 10. This is to insure that a sharp edge is presented to the fluid drip tape 50 which surrounds the junction coupling 10, thus providing greater resistance to separation if the fluid drip tape 50 is pulled away—i.e., toward the left.

Again, continuing in a downstream direction, following the first frustoconical barb 35a is a first cylindrical region 40a, which terminates at the second frustoconical barb 35b. The upstream side of that second frustoconical barb 35b is a slanted flare 34a, while the downstream side is another perpendicular downstream slope 33b, similar in shape and function to first downstream slope 33a.

The next downstream section of the junction coupling 10 is identical. Accordingly, following that second frustoconical barb 35b is a second cylindrical region 40b, which terminates at the third frustoconical barb 35c. The upstream side of that third frustoconical barb 35c is a slanted flare 34b, while the downstream side is another perpendicular downstream slope 33c, again similar in shape and function to first downstream slope 33a, leading to a third cylindrical section 40c.

In the prior art junction coupling illustrated in FIG. 1, there is a fourth frustoconical barb section, similar to the second and third. In this fourth frustoconical barb section, slanted flare 34c leads to the fourth frustoconical barb 35d, and perpendicular downstream slope 33d leads back to the fourth, central cylindrical section 40d.

In this junction coupling, the upstream and downstream portions are symmetric about that central cylindrical section 40d. Thus, in the downstream portion of the junction coupling, the sequence is: central section 40d, first perpendicular upstream slope 43d, fifth frustoconical barb 45d, first downstream slanted flare 44c, fifth cylindrical section 40e, second perpendicular upstream slope 43c, sixth frustoconical barb 45c, second downstream slanted flare 44b, sixth cylindrical section 40f, third perpendicular upstream slope 43b, seventh frustoconical barb 45b, third downstream slanted flare 44a, seventh cylindrical section 40g, fourth perpendicular upstream slope 43*a* and finally outlet taper 46 leading to the outlet opening 25, having an inner circumference 26 and outer circumference 27.

In this same junction coupling, as illustrated in FIG. 1, the inlet tape 50 is cinched to the inlet portion of the junction coupling by means of an inlet wire tie 60—shown without detail in all Figures of the Drawing, because wire ties of the type contemplated have long been commonly used in joining drip tapes and tubes. The wire tie 60 is constricted to compress the inlet tape 50 into the third cylindrical section 40*c*. Similarly, the outlet tape 55 is cinched to the outlet portion of the junction coupling by means of an outlet wire tie 65, which is constricted to compress the outlet tape 55 into the fifth cylindrical section 40*e*. And thus the two drip tapes 50, 55 are joined by means of the prior art junction coupling illustrated in FIG. 1.

However, in the present invention, only one wire tie is to be utilized. The manner in which only one tie can successfully join two portions of drip tape by means of the splicing coupling of the present invention is illustrated, sequentially, in FIGS. 2, 4, 5 and 6.

Figure 2A:
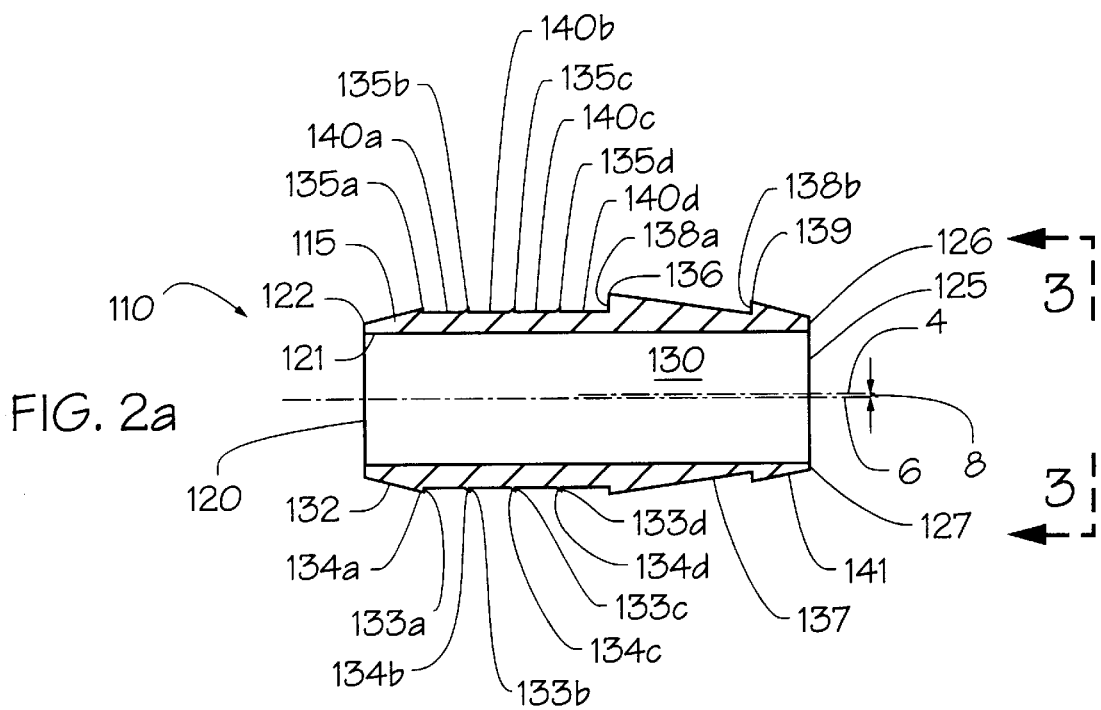
FIG. 2 is a side cross-sectional view of the device of the present invention.
Figure 2B:
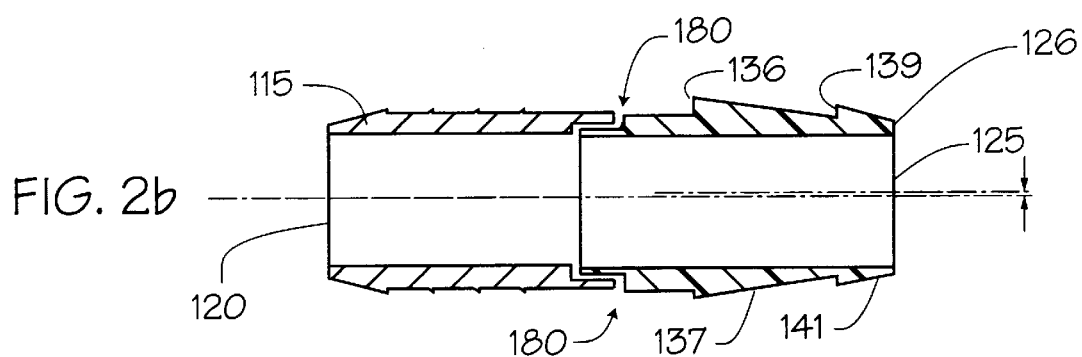

FIG. 2 shows the structure of the splicing coupling 110 of the principal embodiment of the present invention. Again, using the left-to-right fluid flow convention adopted in connection with the above discussion of the prior art junction coupling, the fluid will be assumed to flow from the inlet opening 120 of the splicing coupling 110, through the cylindrical internal bore 130 to the outlet opening 125.

This splicing coupling 110, comprises an outer structure 115 defining the essentially cylindrical bore 130. The splicing coupling 110 possesses an inlet opening 120, comprising an inner circumference 121 and an outer circumference 122, with outer structure 115 intervening. Likewise, the splicing coupling 110 possesses an outlet opening 125, comprising an inner circumference 126 and an outer circumference 127, with outer structure 115 intervening. By way of illustration in one embodiment the inner diameter of openings 120,125 and bore 130 is 0.470 inch or more.

Figure 6:
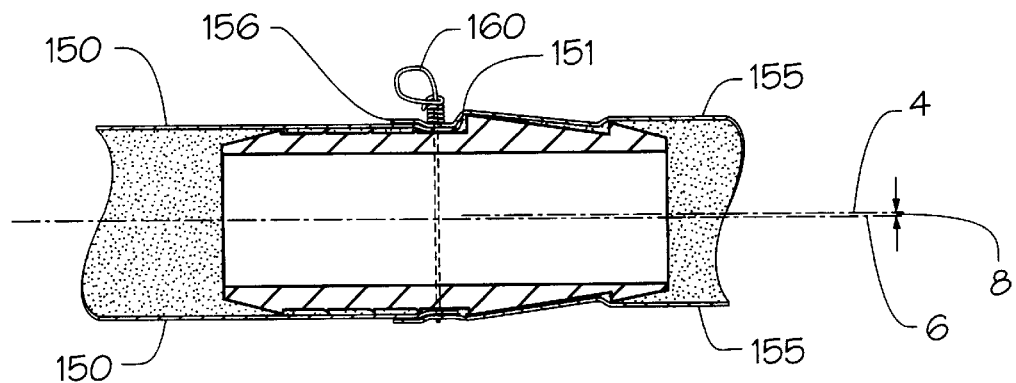
FIG. 6 is a side cross-sectional view of the device shown in FIG. 5, showing both sections of fluid drip tape and a wire tie forming a fluid-tight seal between them.

The outer surface of the splicing coupling 110 progresses from its inlet opening 120, through its straight inlet taper 132 to the first frustoconical barb 135*a*. The first downstream slope 133*a* of that first frustoconical barb 135*a* is perpendicular to the axis 6 of the junction coupling 110. As in the case of the prior art junction coupling 10—and as shown in FIG. 6—this is to insure that a sharp edge is presented to the inlet fluid drip tape 150 which surrounds the junction coupling 110, thus providing greater resistance to separation if the fluid drip tape 150 is pulled away—i.e., toward the left.

Again, continuing in the downstream direction, following the first frustoconical barb 135*a* is a first cylindrical region 140*a*, which terminates at the second frustoconical barb 135*b*. The upstream side of that second frustoconical barb 135*b* is a first slanted flare 134*a*, while the downstream side is a second perpendicular downstream slope 133*b*, similar in shape and function to first downstream slope 133*a*.

The next downstream section of the junction coupling 110 is identical. Accordingly, following that second frustoconical barb 135*b* is a second cylindrical region 140*b*, which terminates at the third frustoconical barb 135*c*. The upstream side of that third frustoconical barb 135*c* is a second slanted flare 134*b*, while the downstream side is a third perpendicular downstream slope 133*c* (again, similar in shape and function to first downstream slope 133*a*), leading to a third cylindrical section 140*c*.

In the principal embodiment of the present invention, as shown in FIG. 2, there is a fourth frustoconical barb section, similar to the second and third. In this fourth frustoconical barb section, a third slanted flare 134*c* leads to the fourth frustoconical barb section 140*d*. Of course, the splicing coupling 110 of the present invention could be produced with a greater or smaller number of frustoconical barb sections, to suit the particular circumstances, without departing from the spirit of this invention. By way of illustration in one embodiment the outer diameter of barbs 135*a*, *b*, *c* and *d* is 0.645 inch and the outer diameter of regions 140*a*, *b*, *c* and *d* is 0.625 inch with the spacing between barbs 135*a*, *b*, *c* and *d* about 0.165 inch.

Here, the splicing coupling 110 of the principal embodiment of the present invention differs most clearly from the prior art junction coupling 10. In particular, the upstream and downstream sections of the splicing coupling 110 of the preferred embodiment of the present invention are not symmetrical about any central circumference. It is this difference which pinpoints a principal advantage of the present invention over the prior art.

Figures 3, 3A:
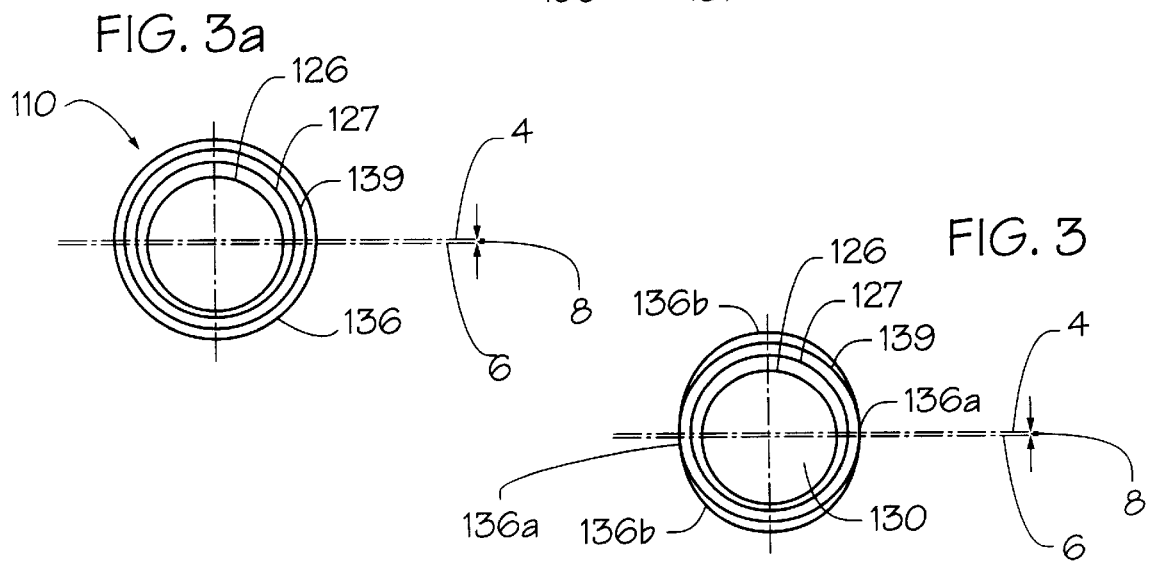
FIG. 3 is a plan view of the preferred embodiment of the device shown in FIG. 2, as seen through section lines 3—3 in FIG. 2.
FIG. 3a is a plan view of the device shown in FIG. 3, according to a different embodiment of the invention.

In the splicing coupling 110, the outer surface rises perpendicularly by first downstream rising slope 138*a* to frustoconical step barb 136. In the principal embodiment of the present invention, the cross-section of the frustoconical step barb 136 is circular although other cross-sectional shapes such as elliptical could be substituted, as shown in FIG. 3, Suffice to say, at this point, that in the preferred embodiment of the present invention, as illustrated in FIG. 3*a*, which is an end elevational view of coupling 110 as viewed from end 125, the cross-section of the frustoconical step barb 136 is circular, and its diameter is greater than that of each of the upstream frustoconical barbs 135*a*,*b*,*c*,*d*. By way of illustration in one embodiment the outer diameter of step barb 136 is 0.700 inch.

Thus, although the outer structure 115 of the preferred embodiment of the present invention has a cross-section consisting essentially of a series of circles throughout its length—as did the outer structure 15 of the prior art junction coupling 10—in the principal embodiment of the present invention, illustrated in FIG. 3*a*, the centers of step barb 136 and other barb 139 in the second section of coupling 110 are transversely offset from the center of bore 130 and hence the centers of barbs 135*a*, *b*, *c* and *d* by an offset 8 between axis 6 of bore 130 and axis 4 of step barb 136 as best shown in FIG. 3*a*. By way of illustration in one embodiment the relative offset of barbs 136 and 139 from barbs 135*a*, *b*, *c* and *d* is about 0.018 inch. Other offsets may be chosen depending on the size of the drip tape spliced by coupling 110 and its elasticity.

Continuing to describe the preferred embodiment of the present invention, the circumference of coupling 110 at frustoconical step barb 136 decreases to a circular circumference at the longitudinal position of secondary downstream frustoconical barb 139, through first straight downstream flare 137. From that point, the surface extends outward perpendicularly through the second downstream rising slope 138*b* to that secondary downstream frustoconical barb 139. Whereupon, outlet taper 141 leads to the outlet opening 125, comprising an inner circumference 126 and an outer circumference 127. By way of illustration in one embodiment the outer diameter of barb 139 is 0.625 inch, the spacing between barbs 136 and 139 is about 0.500 inch, and the outer diameter at the bottom of flare 137 next to the base of barb 139 is about 0.560 inch.

Figure 4:
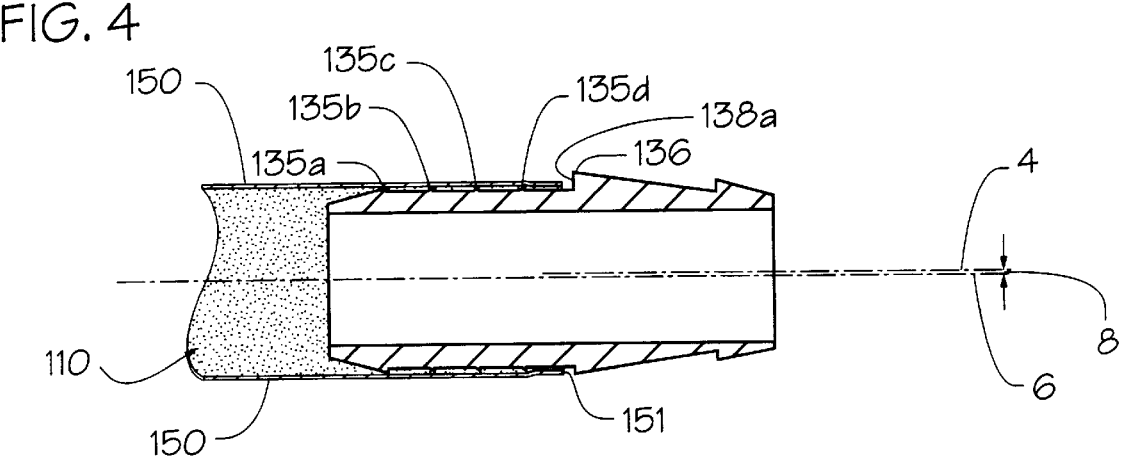
FIG. 4 is a side cross-sectional view of the device shown in FIG. 2, showing the manner in which a first section of fluid drip tape is slid over one end of the device.
Figure 5:
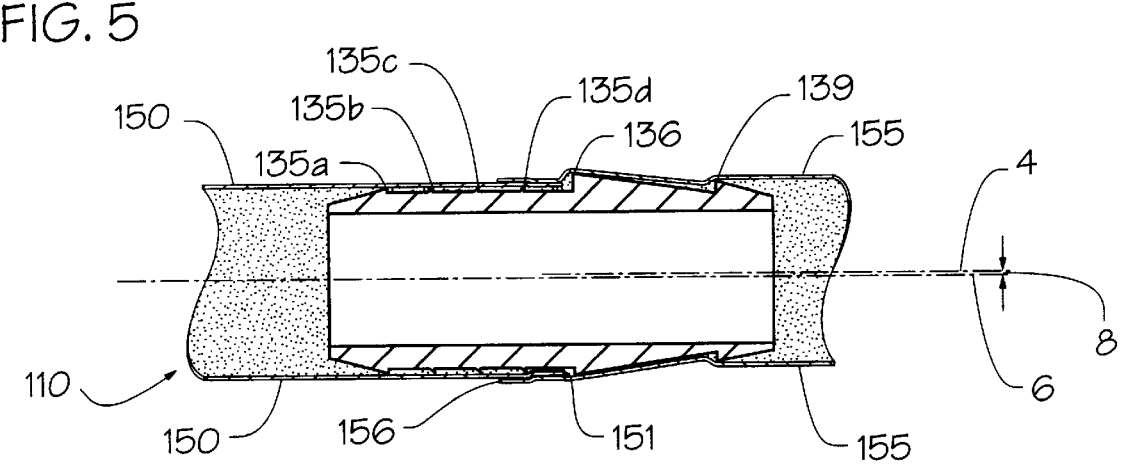
FIG. 5 is a side cross-sectional view of the device shown in FIG. 4, showing the manner in which a second section of fluid drip tape is slid over the other end of the device.

The manner in which the two drip tapes 150, 155 are joined by means of the splicing coupling 110 of the principal embodiment of the invention is illustrated in FIGS. 4, 5 and 6.

First, the leading end 151 of the inlet drip tape 150 is stretched and slid over the four upstream frustoconical barbs 135a,b,c,d, until it abuts the first downstream vertically rising slope 138a, as shown, e.g., in FIG. 4. The tape is preferably aligned with the step barb 136 so that double thickness seam 200 of drip tape 150 is azimuthally aligned in the direction of maximum eccentricity of step barb 136 relative to internal bore 130. In other words, tape 150 is turned so that its seam 200 is in line with the maximum radial extension of step barb 136.

Next, the leading edge of the outlet drip tape 155 is stretched and slid over secondary downstream frustoconical barb 139 and then over frustoconical step barb 136. Tape 155 is azimuthally aligned with step barb 136 so that double seam 200 of tape 155 is opposite the maximum extension of step barb 136. The double seams 200 of tapes 150 and 155 are thus opposite from each other. Whereupon, tape 155 continues to be slid farther over the splicing coupling 110 across offset 8 until the leading edge of the outlet drip tape 155 is upstream of one of the barbs 135a, b, c or d, such as the third upstream frustoconical barb 135c. i.e., the leading edge of the outlet drip tape 155 considerably overlaps the leading edge of the inlet drip tape 150 sufficiently so that two of the upstream frustoconical barbs 135c,d are within both drip tapes 150,155, as shown in FIG. 5. The degree of overlap can of course be varied according to the teachings of the invention. The relative configuration of tape 150 relative to step barb 136 optimizes the ease of installation.

Finally, wire tie 160 is cinched about the outer (i.e., outlet) drip tape 155 and tightened until the outer drip tape 155 and the inner (i.e., inlet) drip tape 150 are compressed tightly against the third cylindrical region 140c, between third upstream frustoconical barb 135c and fourth upstream frustoconical barb 135d, forming a secure, fluid-tight fit, as shown in FIG. 6.

It will be noted that by use of the splicing coupling 110 of the present invention, this overlapping of the inlet drip tape 150 and the outlet drip tape 155 is readily accomplished. That is because frustoconical step barb 136 possesses a diameter which is greater than that of any of the upstream frustoconical barbs 135a,b,c,d and is further offset from them relative to the axis 6 of common bore 130 defined through coupling 110. Thus, when the leading end 156 of the outlet drip tape 155 is slid and stretched over frustoconical step barb 136, that end 156 will have been stretched to a greater diameter than that of inlet drip tape 150 disposed on upstream frustoconical barbs 135a,b,c,d which have a smaller diameter than that of frustoconical step barb 136. This allows the end 156 of the outlet drip tape to be easily slid and stretched over the end 151 of the inlet drip tape 150. By way of illustration in one embodiment, drip tape 150 is circular in cross section and the unstretched inner diameter of drip tape 150 is about 0.625 inch, which can be reliably stretched without tearing to a diameter of somewhat more than 0.700 inch, after which it relaxes to substantially its unstretched diameter. For example, in the illustrated embodiment tape 150 is made of low density polyethylene of about 10 mil thickness to provide the needed lubricity to slide over the barbs when stretched and the needed elasticity to stretch to the size needed and to relax to its substantially unstretched size unless otherwise constrained.

It also must be borne in mind that the difference between the cross-sectional area or diameter of frustoconical step barb 136 need not be much greater than that of the upstream frustoconical barbs 135a,b,c,d, because the material from which drip tape is commonly fabricated is quite thin. That quality allow an easy slide-over without the necessity to expand the end 156 of the outlet drip tape 155 to any great degree, particularly as most commercial drip tapes are constructed of low-friction plastics, which further facilitate relative sliding.

As pointed out above, the designation of the left portion of the devices shown in the Drawing as the inlet end is merely for clarity in this discussion. There is no reason why fluid flow might occur from right to left, in which case drip tape 150 would be the outlet drip tape, while drip tape 155 would be the inlet drip tape. There need be no physical distinction between the inlet and outlet drip tape.

Also, in place of wire ties 160, tightening sleeves (such as hose clamps) or any other circumferential clinching device might be employed, which would likewise not depart from the spirit of this invention or substantially from the teachings herein.

Alternatively, the splicing coupling 110 of the present invention might be implemented by means of a two-piece unit. One piece might constitute the upstream portion, with the inlet opening 120, the upstream frustoconical barbs 135a,b,c,d and the cylindrical sections 140a,b,c,d. The other might constitute the downstream portion: from the frustoconical step barb 136 to the outlet opening 125. The upstream portion might be constructed with a hollow projection which could be inserted into a central bore of the downstream portion, by friction fit or by screw mounting.

And, of course, the number of frustoconical barbs in the inlet and/or outlet portion of the splicing coupling 110 could be varied to suit the particular need, as could the shapes of the various slopes leading to and from the various frustoconical barbs. This would be well within the skill of the ordinary practitioner.

These modifications are merely suggested as illustrating the fact that many further alternations and modifications may be made by those having ordinary skill in the art without departing from the spirit and scope of the invention. Therefore, it must be understood that the illustrated and described embodiments have been set forth only for the purpose of example and that these should not be taken as limiting the invention as defined by the claims which follow.

The words used in this specification to describe the invention and its various embodiments are to be understood not only in the sense of their commonly defined meanings, but also to include, by special definition in this specification, structures, materials or acts beyond the scope of the commonly defined meanings. Thus if an element can be understood in the context of this specification as including more than one meaning, then its use in a claim must be understood ad being generic to all possible meanings supported by the specification and by the word itself.

The definitions of the words or elements of the following claims, therefore, include not only the combination of elements which are literally set forth, but all equivalent structures, materials or acts for performing substantially the same function in substantially the same way to obtain substantially the same result.

Insubstantial departures from the claimed subject matter as viewed by a person with ordinary skill in the art, now known or later devised, are expressly contemplated as being equivalently within the scope of the claims, even though not performing exactly the same function in substantially the same way to obtain substantially the same result. Therefore, substitutions now or later known to one with ordinary skill in the art will be within the scope of the defined elements.

The claims are thus understood to include what is specifically illustrated and described above, what is conceptually equivalent, what can be obviously substituted and also what essentially incorporates the essential idea of the invention.

I claim:

1. A coupling for facilitating the joining of a first and second piece of fluid drip tape, said coupling having a longitudinal axis, a longitudinal length, an outer surface, a first end and an opposing second end, said coupling defining an internal bore surrounding said longitudinal axis, said bore extending through the entirety of said longitudinal length of said coupling from said first end to said second end, said outer surface of said coupling comprising a first longitudinal section and an adjacent second longitudinal section, said first section extending from said first end, comprising a surface of revolution about said axis, comprising:
a first substantially cylindrical portion having a first diameter, and
at least a first barb outwardly extending from said cylindrical portion,
having a generally circular cross-section perpendicular to said axis, and having a second diameter, said second diameter being greater than said first diameter of said cylindrical portion; and
said second section extending from said second end, comprising at least one step barb having a cross-sectional shape, wherein said cross-sectional shape of said step barb is offset from said first barb of said first section relative to said axis, only said first substantially cylindrical portion and said first barb of said first section having said first piece of drip tape concentrically disposed thereover, said step barb of said second section and at least a distal portion of said first substantially cylindrical portion of said first section which is distal from said first barb having said second piece of drip tape concentrically disposed over said second section and further stretched over said distal portion of said first substantially cylindrical portion of said first section.

2. The coupling as recited in claim 1, wherein said cross-sectional shape of said step barb is circular.

3. The coupling as recited in claim 2, wherein said cross-sectional shape of said step barb has a diameter which exceeds said second diameter of said first barb.

4. The coupling as recited in claim 3, wherein said second section further comprises a second barb having a cross-sectional shape, wherein said cross-sectional shape of said second barb of said second section is offset with said step barb from said first barb of said first section relative to said axis, wherein said cross-sectional shape of said step barb and said second barb of said second section is circular, and said diameter of said second barb of said second section does not exceed said second diameter of said first barb of said first section.

5. The coupling as recited in claim 1, wherein said cross-sectional shape of said step barb is elliptical.

6. The coupling as recited in claim 1, wherein said first cylindrical portion of said first section longitudinally intervenes between said first barb and said step barb.

7. The coupling as recited in claim 1, wherein said first barb is frustoconical in shape and said first section further comprises a frustoconical inlet surface extending from said first end to said first barb.

8. The coupling as recited in claim 1, wherein said second section further comprises a second barb having a cross-sectional shape, wherein said cross-sectional shape of said second barb of said second section is offset with said step barb from said first barb of said first section relative to said axis.

9. The coupling as recited in claim 8, wherein said cross-sectional shape of said step barb and said second barb of said second section is circular, and said diameter of said second barb of said second section does not exceed said second diameter of said first barb of said first section.

10. The coupling as recited in claim 8 wherein said step and second barbs of said second section are oriented to resist movement of a drip tape disposed over said plurality of barbs off said second section.

11. The coupling as recited in claim 1, wherein said first section further comprises a plurality of barbs including said first barb disposed along said cylindrical portion of said first section, and said second section includes a second barb, wherein said step and second barb of said second section are offset from said plurality of barbs of said first section relative to said axis.

12. The coupling as recited in claim 1 wherein said first and second sections are integrally formed together.

13. The coupling as recited in claim 1 wherein said first and second sections are separately formed segments and then joined together.

14. A coupling for facilitating the joining of a first and second piece of fluid drip tape, said coupling having a longitudinal axis, an internal bore defined about said axis, a length, a first end and an opposing second end, and an outer surface, said bore extending through said length of said coupling from said first end to said second end, said outer surface of said coupling comprising a first and second longitudinally adjacent section, said first longitudinally adjacent section of said outer surface extending from said first end, comprising a surface of revolution about said axis, comprising:
a substantially cylindrical portion having a first diameter;
a plurality of frustoconical barbs each having a circular cross section through said axis, each frustoconical barb having a second diameter, said second diameter being greater than said first diameter, each of said frustoconical barbs having a length of said cylindrical portion longitudinally intervening therebetween; and
a first frustoconical opening taper extending with continuously increasing cross section from said first end of said coupling to a portion of said outer surface of said coupling having a circular cross section of said second diameter; and
said second longitudinally adjacent section of said outer surface, extending from said second end, comprising:
a step barb, whose cross section comprises a closed conic section about said axis, said first closed conic section having a major axis which exceeds said second diameter;
a second barb, whose cross-section comprises a circle with a diameter less said major dimension of said step barb; and
wherein said step barb and second barb are radially offset with respect to said axis from said plurality of frustoconical barbs of said first section,
a second frusto-conical opening taper extending with continuously decreasing cross-section from said second barb to said second end of said coupling
only said first substantially cylindrical portion, said plurality of frustoconical barbs, and said first frustoconical opening taper of said first longitudinally adjacent section having said first piece of drip tape concentrically disposed thereover, said step barb, second barb and second frusto-conical opening taper of said second longitudinally adjacent section and at least a distal portion of said first substantially cylindrical portion of said first longitudinally adjacent section which is distal from the closest of said plurality of frustoconical barbs having said second piece of drip tape concentrically disposed over said second longitudinally adjacent section and further stretched over said distal portion of said first substantially cylindrical portion of said first longitudinally adjacent section.

15. The coupling as recited in claim 14, wherein said conic section is a circle, whose diameter exceeds said second diameter.

16. The coupling as recited in claim 14, wherein said conic section is an ellipse.

* * * * *